United States Patent [19]

Kawasaki et al.

[11] Patent Number: 5,594,825
[45] Date of Patent: Jan. 14, 1997

[54] OPTICAL CONNECTOR COUPLING FOR REDUCING UNWANTED EFFECTS ASSOCIATED WITH HIGH POWER DENSITY

[75] Inventors: Brian S. Kawasaki, Manotick; Richard R. Parker, Charleton Place, both of Canada

[73] Assignee: JDS Fitel Inc., Nepean, Canada

[21] Appl. No.: 565,573

[22] Filed: Nov. 30, 1995

[51] Int. Cl.$^6$ .................................................. G02B 6/38
[52] U.S. Cl. ........................ 385/60; 385/27; 385/28; 385/35; 385/61; 385/70; 385/72; 385/78; 385/79; 385/66; 385/84
[58] Field of Search ................................ 385/27, 28, 31, 385/15, 33, 35, 53, 56, 60, 61, 70, 73, 74, 66, 78, 84, 79, 43

[56] References Cited

U.S. PATENT DOCUMENTS

| | | | |
|---|---|---|---|
| 4,763,976 | 8/1988 | Nolan et al. | 385/28 X |
| 4,854,663 | 8/1989 | Borsuk et al. | 385/33 X |
| 4,877,300 | 10/1989 | Newhouse et al. | 385/43 X |
| 5,071,217 | 12/1991 | Birch | 385/33 |
| 5,301,252 | 4/1994 | Yanagawa et al. | 385/96 |

FOREIGN PATENT DOCUMENTS 2-208608   8/1990   Japan ............................. 385/35

Primary Examiner—Brian Healy
Attorney, Agent, or Firm—Neil Teitelbaum and Associates

[57] ABSTRACT

An optical connector ferrule is provided having an standard single mode optical fiber therein whose mode field diameter is approximately 10 μm along its length. An end portion and the end face of the optical fiber are heated to thermally expanded the mode field diameter to approximately 20 μm or greater for reducing power density at the end face. By providing an expanded mode field diameter at the end face of the fiber, the power density is lessened, thereby lessening the probability that any dirt or debris at the end face will become heated sufficiently to damage the optical fiber.

10 Claims, 5 Drawing Sheets

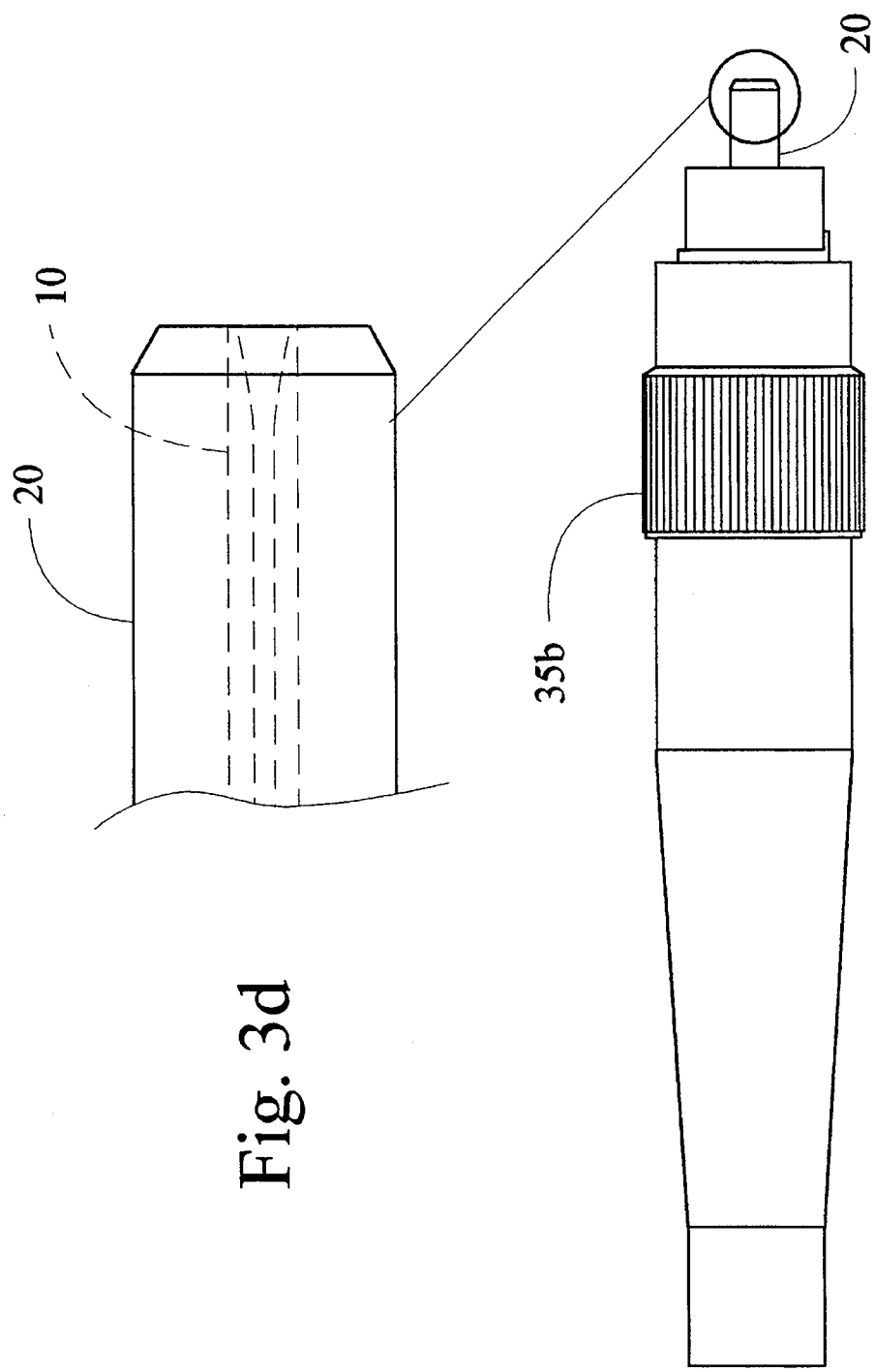

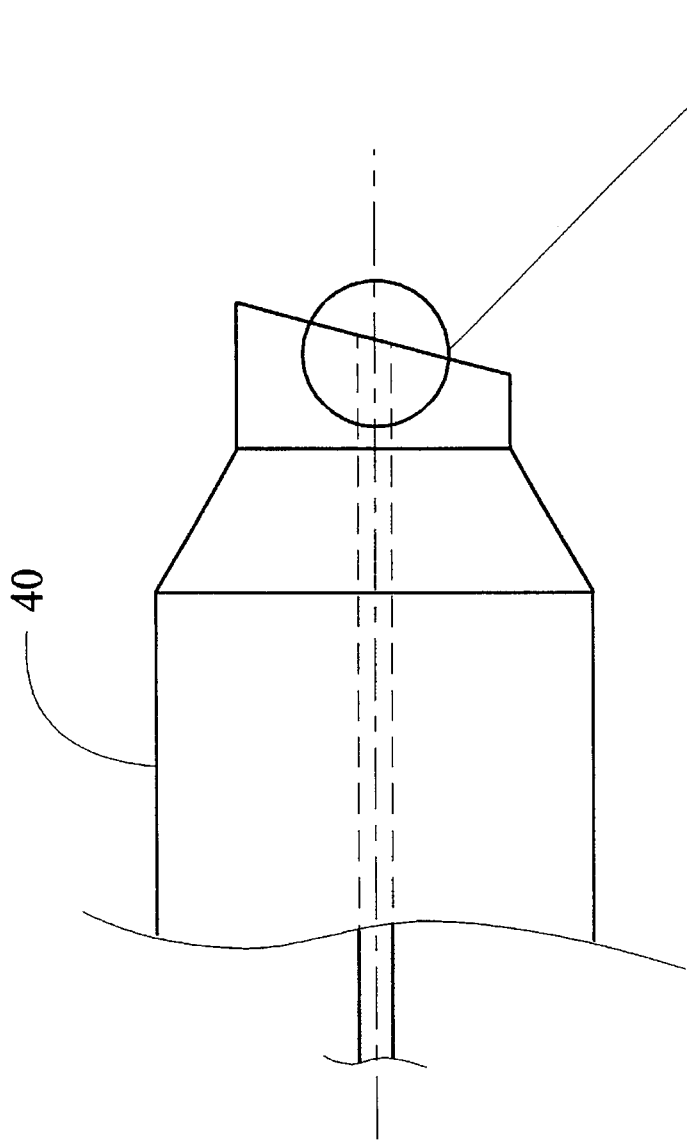
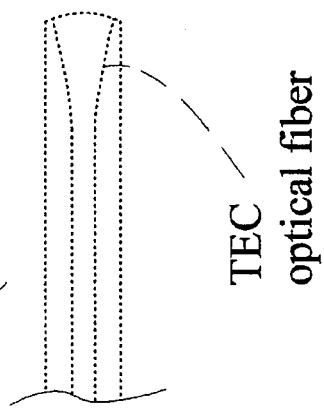
Fig. 4a
Fig. 4b
40
TEC optical fiber

OPTICAL CONNECTOR COUPLING FOR REDUCING UNWANTED EFFECTS ASSOCIATED WITH HIGH POWER DENSITY

FIELD OF THE INVENTION

This invention relates to coupling light from one optical fiber to another within an optical connector.

BACKGROUND OF THE INVENTION

Various types of connectors are known that provide low loss coupling of optical fibers. They typically comprise a plug and a receptacle or a plug-adapter-plug arrangement wherein precision mating coaxial components of the connector assembly containing prealigned fibers with optically prepared ends are brought together in the connecting process to achieve alignment and abutment of the mating fibers to within micron tolerances. These mating surfaces are usually covered with protective caps that are removed prior to engagement. The connecting fibers can also be achieved within alignment guides such as that described in U.S. Pat. No. 4,224,214, wherein fibers are coaxially aligned by their own precision outside diameters in a common V-groove or other means. Fiber ends are susceptible to contamination prior to engagement. Various prior art patents address the issue and attempt to provide solutions to reduce the amount of contamination from dirt, debris, grease, and other contaminants, however, this problem continues to exist. In fact, as of late, the effects of contaminants on an end face surface of an optical fiber connector have become an increasingly larger problem than in the past. This is due in part to the fact that high energy optical signals are becoming more commonplace with an increased use of rare-earth doped optical fiber amplifiers. As well, the problem of dirt and debris present at the fiber end face is becoming increasingly more serious with recent requirements to use optical fibers having a small core diameter, i.e. in the range of 6 microns or less. An impetus for utilizing a fiber of this type, having a small mode field diameter (MFD), is a high power density that is desirable for pumping rare earth, (i.e. erbium) doped amplifying optical fiber. However, high power optical energy propagating within a small MFD produces an optical power density at a fiber end face that is excessively high. At times when debris is present at a connector end face and is heated up by this concentrated optical signal, the heated particles scorch, pit, and damage the end face of the optical fiber connector end, rendering it useless for further transmission. The damage to the connector end in some instances is so severe, that is believed that these contaminant particles actually explode in the presence of sufficient concentrated light energy. This problem is known to exist in standard single mode optical fiber having a MFD of about 10 μm with optical signals having about 100 milliwatts of power, and is yet more damaging in instances where these or higher power optical signals are concentrated in a smaller core diameter optical fiber. In practice coupling two optical fibers carrying very high density power signals has required that the optical fiber ends be permanently fused rather than releasably coupled by a connector to obviate this potential hazard caused by debris at a connector end face.

It is an object of this invention to provide a connector that is less vulnerable to dirt and debris at a connector end face in the presence of high power density optical energy.

It is an object of the invention to attempt to overcome some of these known limitations of prior art connectors.

STATEMENT OF THE INVENTION

In accordance with the invention an optical fiber connector assembly is provided for reducing power density at connector end faces and for assembling a pair of substantially small core optical fibers in an aligned position. The connector assembly comprises first and second ferrules, each adapted to be fixed to the end of an optical fiber, each of said first and second ferrules having an aperture extending therethrough for accommodating an end portion of one of the optical fibers, an end face and adjacent portion of each optical fiber having an expanded mode field diameter, a length of the optical fiber adjacent and axially symmetric to the expanded mode field portion having a mode field diameter of substantially about 4 μm or less. The connector assembly further includes means for releasably locking two front ends of the ferrules in contact with one another so that light may pass from one ferrule end to another through one fiber end face having an expanded mode field diameter to another fiber end face having an expanded mode field diameter.

In accordance with the invention there is further provided, an optical connector ferrule for reducing power density at an end face. The connector ferrule includes a cylindrical body having a longitudinal axis, the body having an opening along said axis; and, an optical fiber in the opening, the optical fiber having a mode field diameter of substantially about or less than 12 μm along most of its length, and having an end portion that has a mode field diameter that is expanded to substantially about 20 μm or more.

BRIEF DESCRIPTION OF THE DRAWINGS

Exemplary embodiments of the invention will now be described in conjunction with the drawings in which:

FIG. 3a is a side view of a prior art connector;

FIG. 3b is an enlarged view of a portion of and end portion of the connector shown in FIG. 3a;

FIG. 3c is a side view of a connector in accordance with the invention having a TEC fiber inserted therein;

FIG. 3d is an enlarged view of the connector end shown in FIG. 3c;

FIG. 4a is a side view of an angled ferrule having a TEC fiber inserted therein, in accordance with the invention; and, FIG. 4b is an enlarged view of the TEC fiber shown in FIG. 4b, in accordance with the invention.

DETAILED DESCRIPTION

A conventional beam expanding fiber is disclosed in a reference entitled "Beam Expanding Fiber Using Thermal Diffusion of the Dopant" in Journal of Lightwave Technology. Vol. 8, No. 8 August 1990. The beam expanding fiber of the above reference has a core whose index of refraction is determined by the dopant e.g., Ge, that is thermally diffused so that a spot size of the fundamental mode, which corresponds to "mode-field diameter of the optical fiber", is partially expanded.

It is known that by increasing the MFD at the end of the optical fiber as shown in the above reference, it is possible to insert a lensless optical device between the fibers with the expanded mode fields without significant loss increase. Furthermore, mode field expanded fiber is becoming of interest and useful for matching two dissimilar optical fibers.

Figure 1:
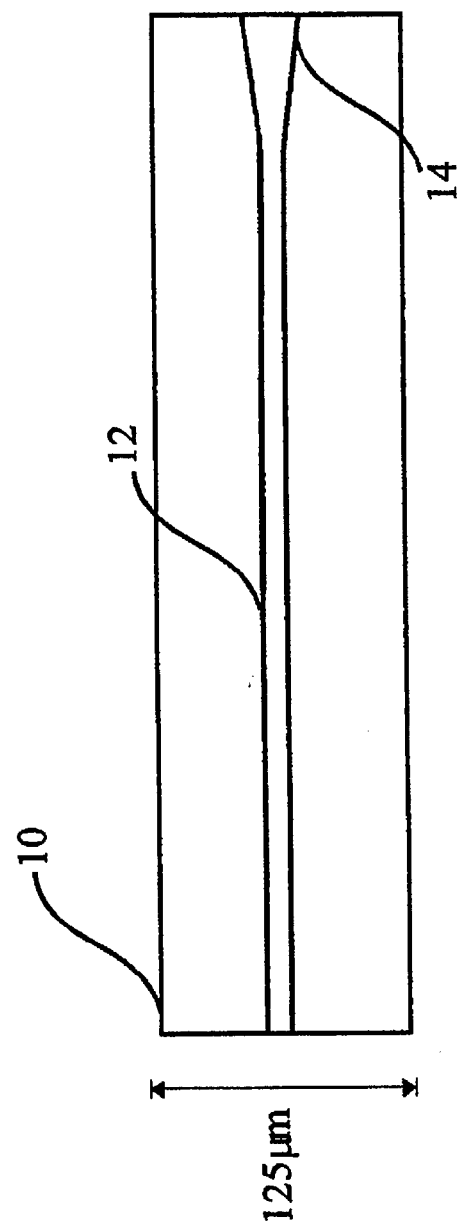
FIG. 1 is a side view of a optical fiber having a thermally expanded mode field diameter as is known in the prior art.

Referring now to FIG. 1, a conventional thermally expanded core (TEC) optical fiber 10 is shown. The fiber 10 is typical single mode fiber having a core diameter throughout most of its length 12 of 10 µm; through the application of heat by flame, by a resistive heater, or by conduction, a 3 mm to 5 mm portion 14 of the fiber end is expanded to have a mode field diameter (MFD) of between 30 to 50 µm.

This invention makes use of a larger MFD at the expanded end of a TEC optical fiber to reduce the high power density at the output of a connector end face. By providing a TEC fiber at an end face of a connector the optical power density is reduced within the fiber by being distributed over a greater MFD. This thereby reduces the power density at any given location on the end face and in some instances obviates the unwanted negative effects that may otherwise be present if the power was more concentrated as is the case within a single mode standard optical fiber. With a lower power density at the end face, a particle of dirt is less likely to become excessively hot and there is less risk of damage to the fiber end face.

Figure 2:
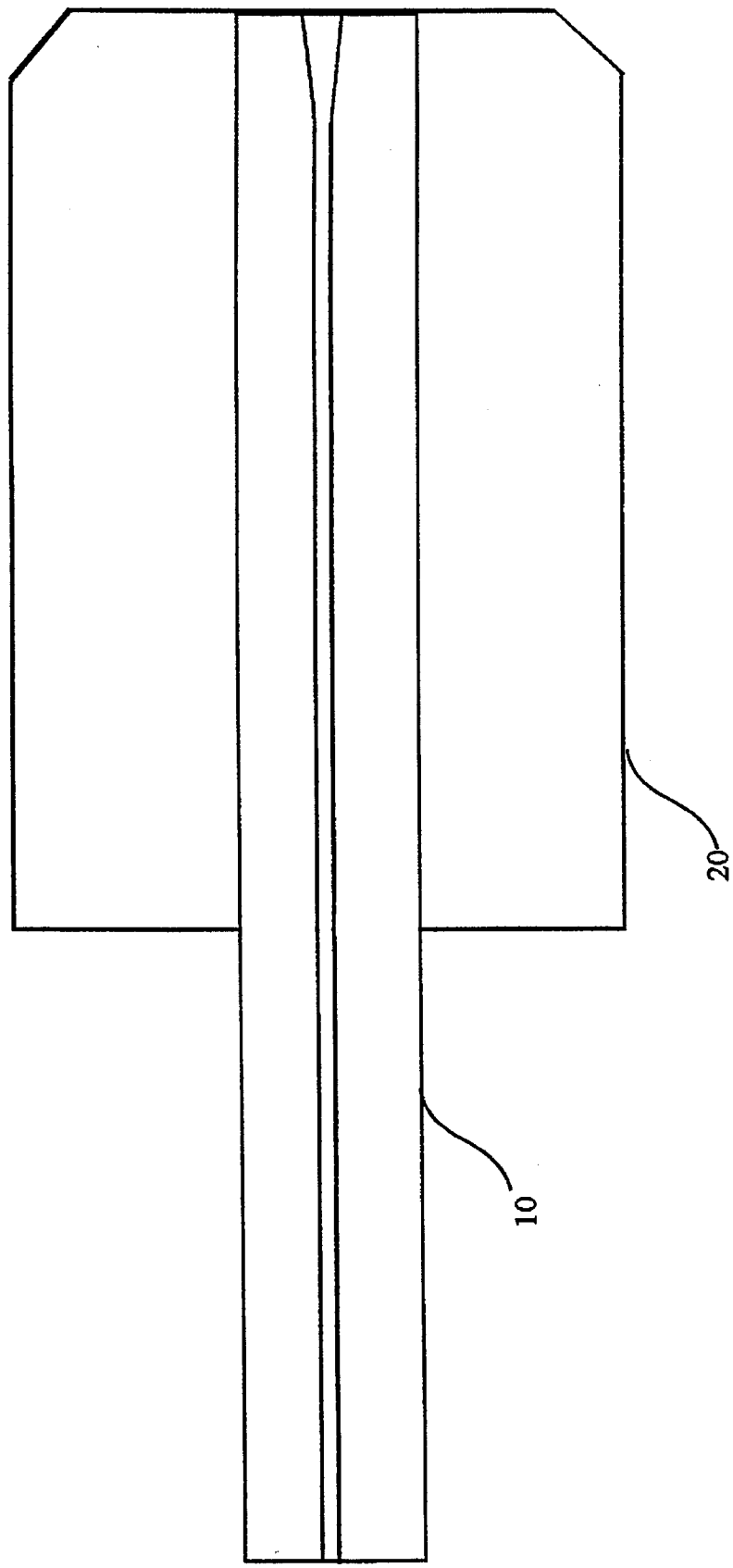
FIG. 2 is a side view of an optical ferrule housing a TEC optical fiber in accordance with the invention.

Turning now to FIG. 2, a first optical fiber 10 is shown having a MFD of about 10 µm along the majority of its length; the optical 10 fiber has an end face inserted into a connector ferrule 20. The optical fiber end face and adjacent 4 mm of optical fiber have an expanded mode field of 30 µm or greater. A mating connector end face is shown having a second identical fiber 22 with a MFD substantially along its length of 10 µm. The second optical fiber end and adjacent 4 mm length of optical fiber has an expanded mode field of 30 µm. The power density within the 10 µm section of optical fiber having, for example a 100 mW signal propagating within the fiber is ~1.27×10$_9$ W/m, wherein the power density at the thermally expanded end face is ~0.141×10$^9$ W/m since the power density is proportional to the 1/MFD$^2$.

Figures 3A, 3B:
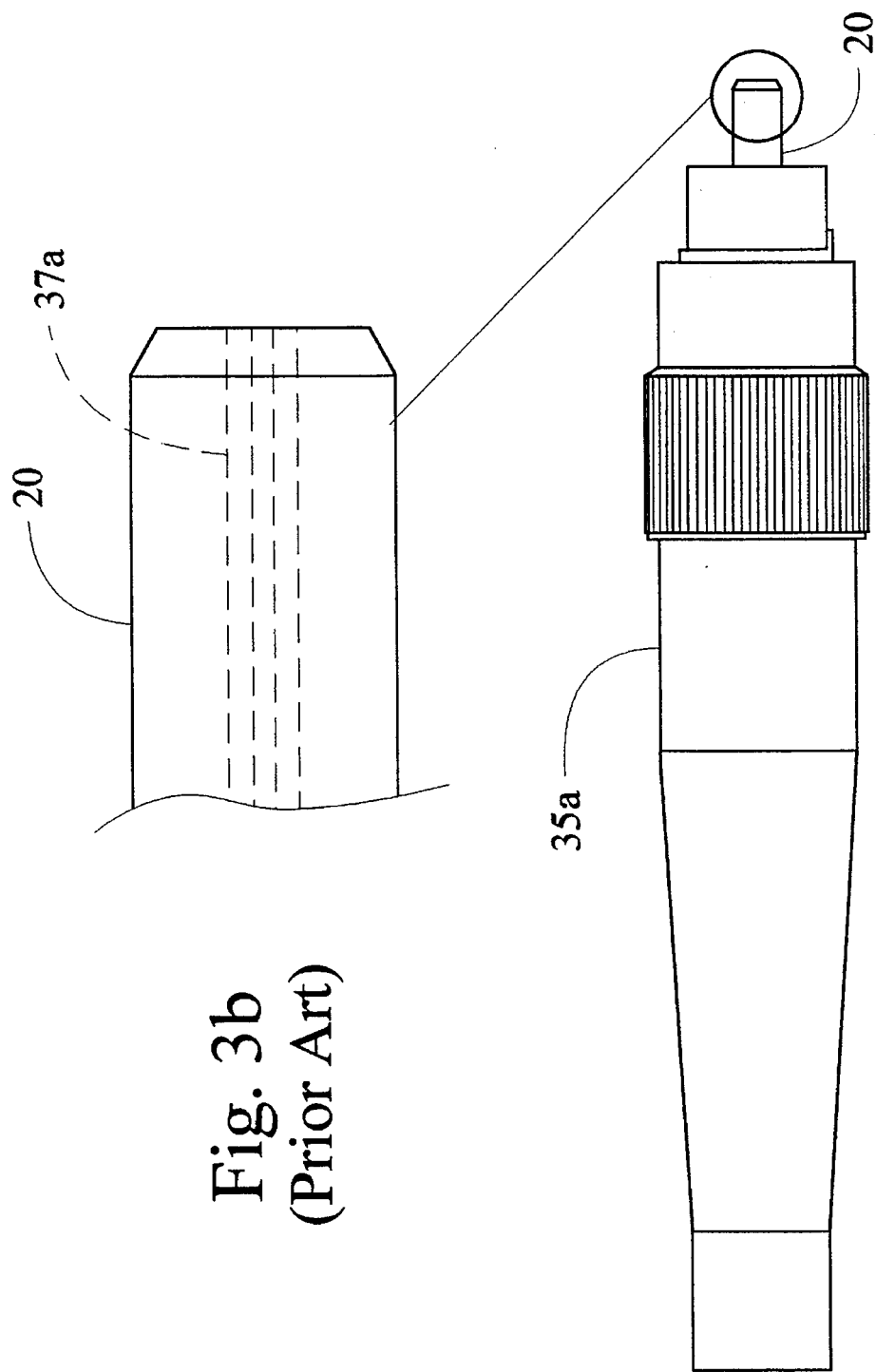

Referring now to FIG. 3a to 3d (not drawn to scale), two optical fiber connectors are shown, similar in construction, however having optical fibers therein with differing mode field diameters. FIG. 3a depicts one side of a conventional connector 35a having a conventional single mode fiber 37a whose diameter throughout is substantially about 10 µm. FIG. 3c, in accordance with the invention shows a single connector 35b end that may be coupled to a mating connector (not shown), or that may be coupled to a face plate of a bulkhead of an optical system. The connector conveniently includes a TEC fiber 10 disposed within a sleeve or ferrule 20.

Aside from the advantages described heretofore, relating to a connector that is somewhat tolerant of dirt and debris in the presence of high power signals, there are of course other added benefits to using TEC fiber 10 at a connector end face. Since the expanded mode field diameter occupies a greater physical space and provides a broader beam exiting the end face of the connector, the blocking effect of a microscopic particle of dirt present at the end face is lessened, as there is a greater surface area from which the light may pass.

Yet another advantage of using a fiber having an expanded MFD at its end is related to the fact that the numerical aperture (NA) of the expanded core end is smaller than the NA for a standard single mode optical fiber with a MFD in the range of 10 µm or less. By tilting the end face of the connector by a little as 2 degrees from the perpendicular of the optical axis of the optical fiber, reflections are significantly reduced. This is more clearly understood with reference to FIG. 4a and 4b where a ferrule 40 is shown having its end face tilted. The smaller NA value associated with a TEC optical fiber end, reduces the angle that is necessary to lessen the effect of back reflections. Even in the absence of providing an angled end face of the optical fiber, the decrease in NA lessens the probability that back reflections will significantly be reflected back into the optical fiber.

Numerous other embodiments may be envisaged without departing from the spirit and scope of the invention.

What we claim is:

1. An optical fiber connector assembly for reducing power density at connector end faces and for assembling a pair of substantially small core optical fibers in an aligned position, comprising:

first and second ferrules, each adapted to be fixed to the end of an optical fiber, each of said first and second ferrules being formed with an aperture extending therethrough for accommodating an end portion of one of the optical fibers, an end face and adjacent portion of each optical fiber having an expanded mode field diameter, a substantial length of the optical fiber adjacent the expanded mode field portion having a mode field diameter of substantially about 10 µm or less; and, means for releasably locking two front ends of the ferrules in contact with one another so that light may pass from one ferrule to another through one fiber end face having an expanded mode field diameter to another fiber end face having an expanded mode field diameter.

2. An optical fiber connector assembly as defined in claim 1, wherein the expanded mode field diameter is greater than 20 µm.

3. An optical fiber connector assembly as defined in claim 2, wherein the two front ends of the ferrules are curved.

4. An optical fiber connector assembly as defined in claim 1, wherein the two front ends of the ferrules are tilted at an oblique angle to the longitudinal axis.

5. An optical fiber connector assembly as defined in claim 4, wherein the end faces of the optical fibers having thermally expanded mode field diameters are hemispherical in shape.

6. An optical fiber connector assembly as defined in claim 1, wherein the mode field diameter of the optical fiber portion adjacent the mode field diameter expanded portion is 4 µm or less.

7. An optical connector female for reducing power density at an end face comprising:

a cylindrical body having a longitudinal axis, the body having an opening along said axis; and, an optical fiber in the opening, the optical fiber having a mode field diameter of substantially about or less than 10 µm along most of its length, and having an end portion that has a mode field diameter that is expanded to more than 20 µm.

8. The optical connector ferrule as defined in claim 7, having an end face that forms an angle of 2 degrees or more with respect to a line perpendicular to the longitudinal optical axis of the optical fiber to lessen the effect of back reflections that may be present.

9. An optical fiber connector as defined in claim 7, wherein and end face of the end portion of the optical fiber is hemispherical in shape.

10. An optical connector ferrule for reducing power density at an end face thereof, comprising:

a cylindrical body having a longitudinal axis, the body having an opening along said axis; and, a single mode optical fiber in the opening, the optical fiber having a mode field diameter of substantially about or less than x μm along most of its length, and having an end portion that has a mode field diameter that is expanded to more than 3x μm, where x<6.

* * * * *